(12) United States Patent
Yoshikawa et al.

(10) Patent No.: US 7,784,866 B2
(45) Date of Patent: Aug. 31, 2010

(54) OCCUPANT RESTRAINT DEVICE

(75) Inventors: Hiromichi Yoshikawa, Tokyo (JP);
Masayoshi Kumagai, Tokyo (JP)

(73) Assignee: Takata Corporation, Tokyo (JP)

( * ) Notice: Subject to any disclaimer, the term of this patent is extended or adjusted under 35 U.S.C. 154(b) by 277 days.

(21) Appl. No.: 11/918,544

(22) PCT Filed: Oct. 23, 2006

(86) PCT No.: PCT/JP2006/321029

§ 371 (c)(1),
(2), (4) Date: Oct. 15, 2007

(87) PCT Pub. No.: WO2007/049541

PCT Pub. Date: May 3, 2007

(65) Prior Publication Data

US 2009/0039631 A1 Feb. 12, 2009

(30) Foreign Application Priority Data

Oct. 28, 2005 (JP) .............................. 2005-314860

(51) Int. Cl.
*B60N 2/42* (2006.01)
(52) U.S. Cl. ................................. 297/216.1; 280/730.1
(58) Field of Classification Search ............... 297/284.1, 297/284.11, 216.1; 280/730.1
See application file for complete search history.

(56) References Cited

U.S. PATENT DOCUMENTS

| 6,402,245 | B1 * | 6/2002 | Newton et al. | ......... 297/284.11 |
| 6,752,454 | B2 * | 6/2004 | Ruel et al. | ............... 297/216.1 |
| 7,549,674 | B2 * | 6/2009 | Yoshikawa et al. | .... 280/730.1 X |
| 2002/0020996 | A1 | 2/2002 | Eckert et al. | |
| 2005/0184490 | A1 * | 8/2005 | Itoga et al. | ............ 280/730.1 X |
| 2006/0138816 | A1 * | 6/2006 | Yoshikawa | ........... 297/216.1 X |
| 2007/0090633 | A1 * | 4/2007 | Hiruta et al. | .......... 280/730.1 X |

FOREIGN PATENT DOCUMENTS

| JP | H10-217818 | 8/1998 |
| JP | 2001-247010 | 9/2001 |
| JP | 2005-126051 | 5/2005 |
| JP | 2005-231624 | 9/2005 |
| JP | 2005-280442 | 10/2005 |
| JP | 2005-297582 | 10/2005 |
| WO | WO 2004/069586 | 8/2004 |
| WO | WO 2004/113115 | 12/2004 |

* cited by examiner

*Primary Examiner*—Anthony D Barfield
(74) *Attorney, Agent, or Firm*—Manabu Kanesaka (57) ABSTRACT

An occupant restraint device 10 in which a bag is disposed without being folded includes a bag 12 disposed above the seat pan 8 and being inflatable to push a front portion of the seat cushion from below, and a gas generator 14 for inflating the bag 12. The bag 12 is disposed on the seat pan 8 in a flattened state without being folded.

9 Claims, 11 Drawing Sheets

OCCUPANT RESTRAINT DEVICE

TECHNICAL FIELD

The present invention relates to an occupant restraint device that restrains an occupant sitting on a seat of a vehicle such as an automobile at the time of collision, and more particularly, it relates to an occupant restraint device that restrains the hip region of the occupant at the time of front collision so as to prevent the body of the occupant from being moved forward and downward.

BACKGROUND ART

An example of a system that restrains an occupant of an automobile at the time of collision may be an occupant restraint device that prevents a submarine phenomenon from occurring in which even though the occupant fastens a seat belt, the occupant may slip through the lower side of a lap belt at the time of front collision. Japanese Unexamined Patent Application Publication No. 10-217818 discloses an occupant restraint device having an inflatable bag disposed between a seat cushion and a seat pan. The bag is inflated at the time of vehicle collision, so that a front portion of the seat cushion is pushed up.

Figure 5A:
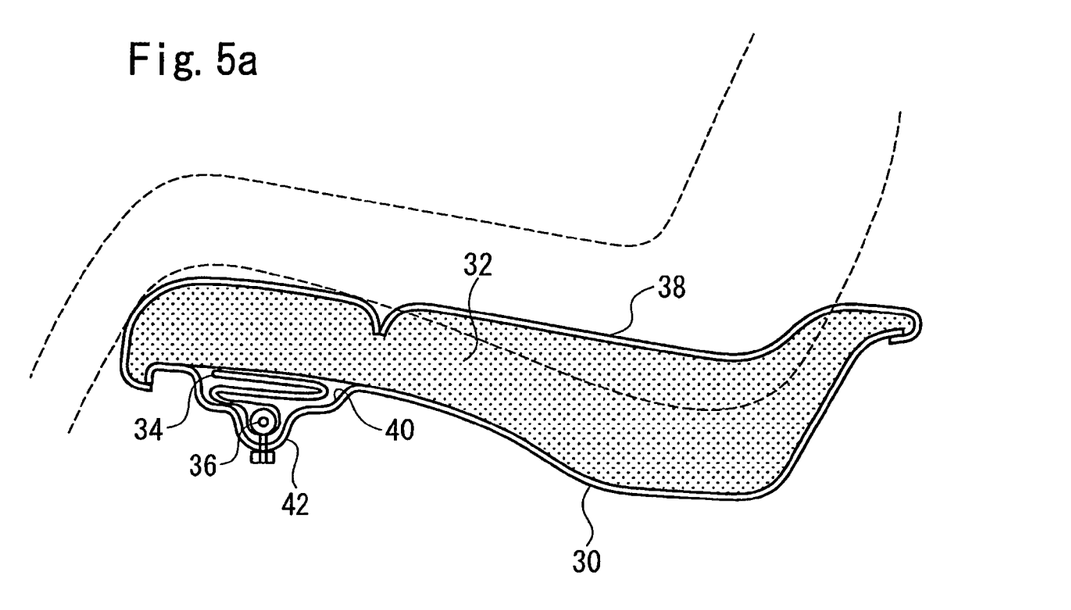
FIGS. 5a and 5b are cross-sectional views each showing an occupant restraint device of a related art.
Figure 5B:
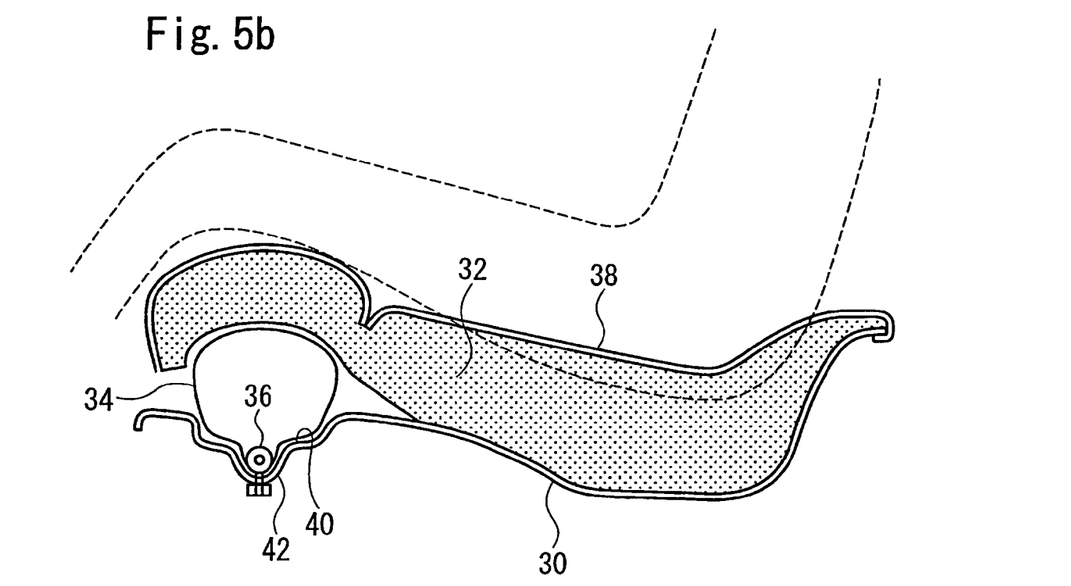

FIGS. 5a and 5b are cross-sectional views taken along a front-back direction of a seat, each showing the occupant restraint device disclosed in the above-mentioned publication. FIG. 5a illustrates a bag in a not-inflated state, and FIG. 5b illustrates the bag in an inflated state. In the front portion of the seat, an airbag 34 is disposed between a cushion frame (seat pan) 30 and a seat pad (seat cushion) 32. The airbag 34 extends in a left-right width direction of the seat, and is inflatable by way of an inflator (gas generator) 36. The airbag 34 is folded, and disposed above the inflator 36. An upper surface of the seat pad 32 is covered with a trim cover 38, and an occupant sits thereon.

In the occupant restraint device disclosed in Japanese Unexamined Patent Application Publication No. 10-217818, a recessed portion 40 is formed at the seat pan 30, and a deep portion 42 is formed at the bottom of the recessed portion 40, the bottom of the deep portion 42 being one step lower than that of the recessed portion 40. The inflator 36 is disposed in the deep portion 42, and the airbag 34 is disposed in the recessed portion 40.

When the inflator 36 is actuated at the time of vehicle collision, the airbag 34 is inflated, and the forward movement of the body of the occupant is prevented (or restricted) because the front portion of the seat pad 32 is pushed up, or because the density of the front portion of the seat pad 32 is increased by being pushed from below.

Patent Document 1: Japanese Unexamined Patent Application Publication No. 10-217818

In Japanese Unexamined Patent Application Publication No. 10-217818, since the airbag 34 is folded and disposed, the folding work may be troublesome. In addition, when the airbag 34 is inflated, the airbag 34 may receive a relatively large frictional resistance from the seat cushion 32. Accordingly, the output of the inflator 36 is required to be large by the amount of frictional resistance.

Also, in Japanese Unexamined Patent Application Publication No. 10-217818, since the airbag 34 is folded, the height of the airbag 34 becomes large, and thus, the depth of the recessed portion 40 is required to be large by the amount of increase in height of the airbag 34.

DISCLOSURE OF INVENTION

To solve the above-described problems of the related art, an object of the present invention is to provide an occupant restraint device with a bag which is disposed without being folded.

An occupant restraint device of the present invention includes a bag that is inflatable to press a seat cushion from below, and a gas generator that inflates the bag in an emergency situation of a vehicle, in which the bag is disposed below the seat cushion with a portion of the bag to be inflated being in a flattened state substantially without being folded.

A part of the bag or the entire bag may be disposed on a seat pan.

A recessed portion may be provided at a part of the seat pan, and the gas generator may be disposed in the recessed portion.

The gas generator may be disposed below the seat pan.

BRIEF DESCRIPTION OF THE DRAWINGS

FIGS. 2a and 2b are cross-sectional views taken along a line II-II of FIG. 1, in which FIG. 2a illustrates a bag in a not-inflated state, and FIG. 2b illustrates the bag in an inflated state.

BEST MODE FOR CARRYING OUT THE INVENTION

With the occupant restraint device of the present invention, since the portion to be inflated is disposed with a portion of the bag to be inflated in a flattened state substantially without being folded, a friction generated between the seat cushion and the bag when the bag is inflated is small. Therefore, without increasing the output of the gas generator, the bag may be inflated immediately.

Also, since the bag is flat, the occupant sits on the seat cushion comfortably.

In the present invention, it should be noted that the expression "the portion to be inflated of the bag being in the flattened state substantially without being folded" means that the almost entire region (e.g., 90% or more) of the portion to be inflated of the bag is not folded and disposed in the flattened state. Therefore, for example, a margin to be joined (margin to be sewn, etc.) located at a peripheral edge or the like of the bag may be folded, a part of the portion to be inflated which is located near the margin to be coupled may be folded, and the surface of the bag may include a fold caused by a slack of the bag. Also, in the present invention, the bag may be bent corresponding to the shape of the upper surface of the seat pad, or the shape of the lower surface of the seat cushion.

The bag may be entirely disposed on the seat pan, or a part of the bag may be disposed on the seat pan while a residual part is disposed on a zigzag spring.

In the present invention, the gas generator may be disposed below the seat pan, or in a recessed portion formed at the seat pan. Accordingly, the gas generator does not protrude upward, thereby allowing the occupant to sit on the seat cushion comfortably.

Embodiments of the present invention are described below with reference to the attached drawings.

Figure 1:
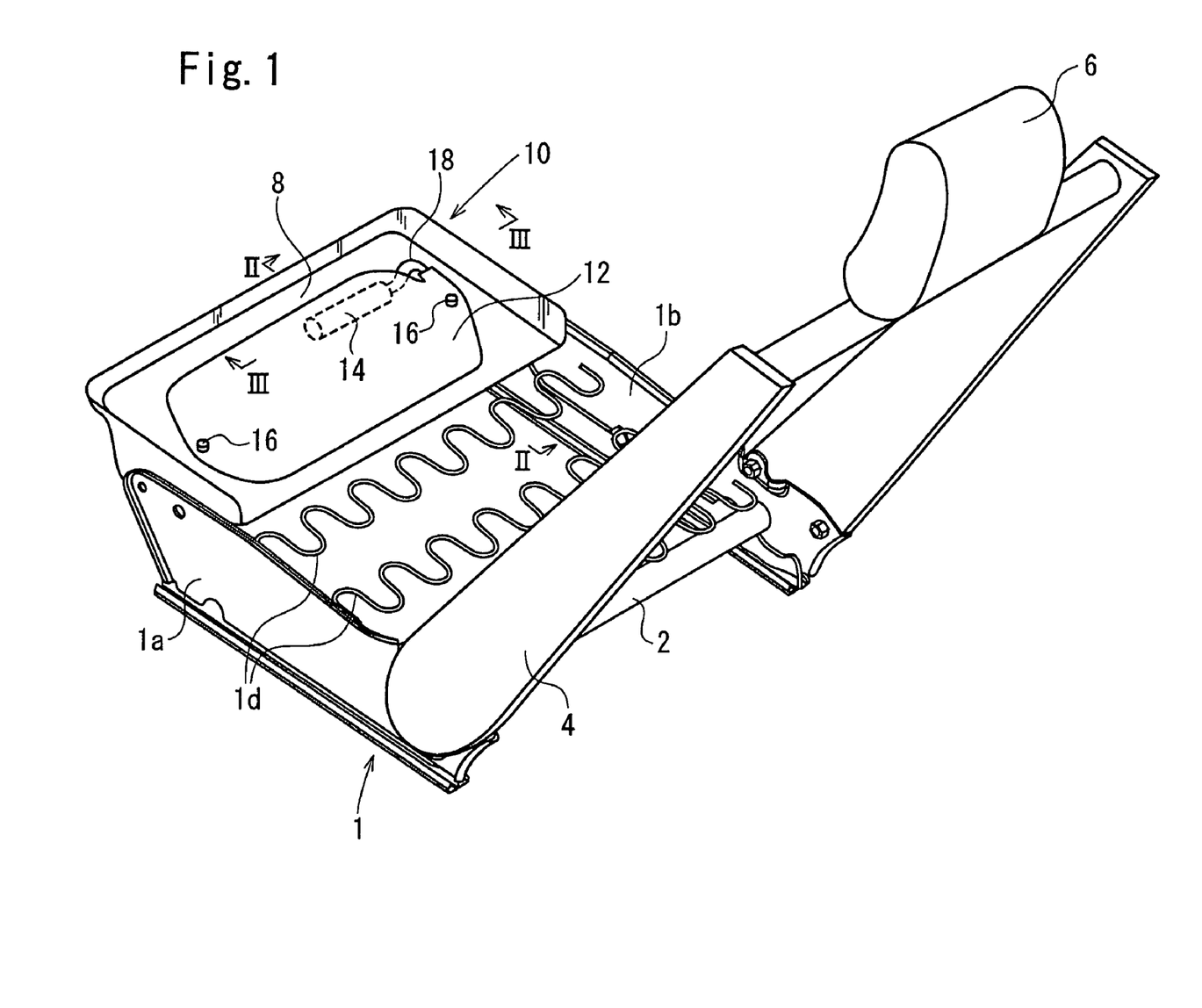
FIG. 1 is a perspective view showing a seat frame provided with an occupant restraint device according to an embodiment.
Figure 2A:
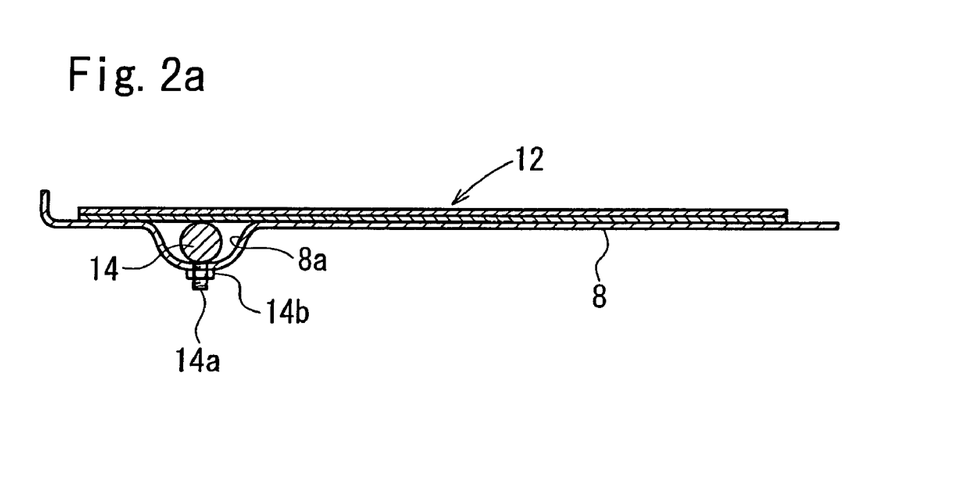
Figure 2B:
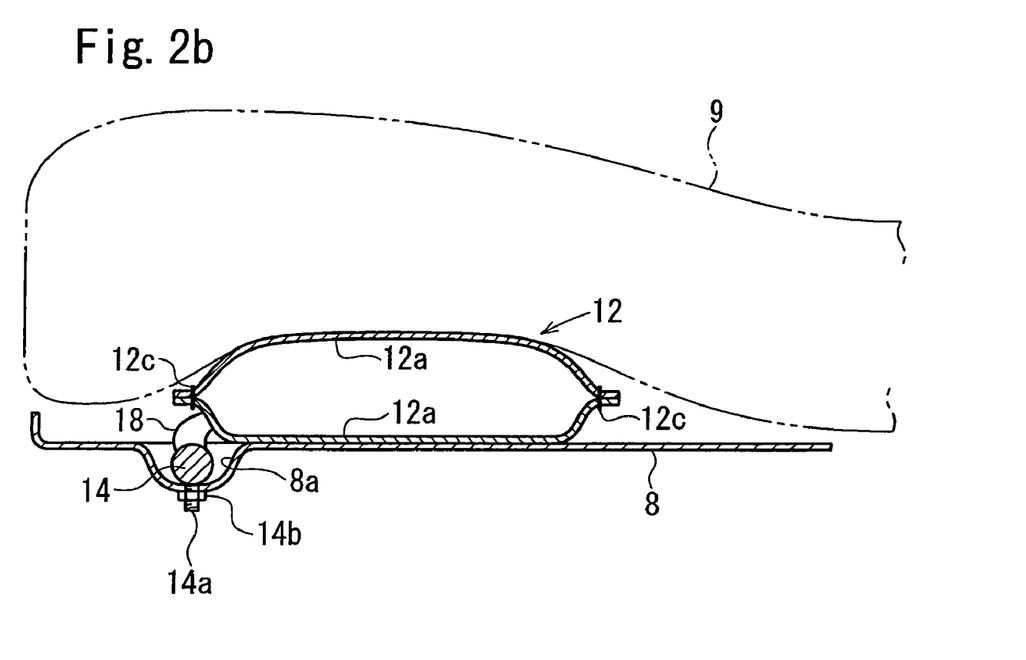
Figure 3:
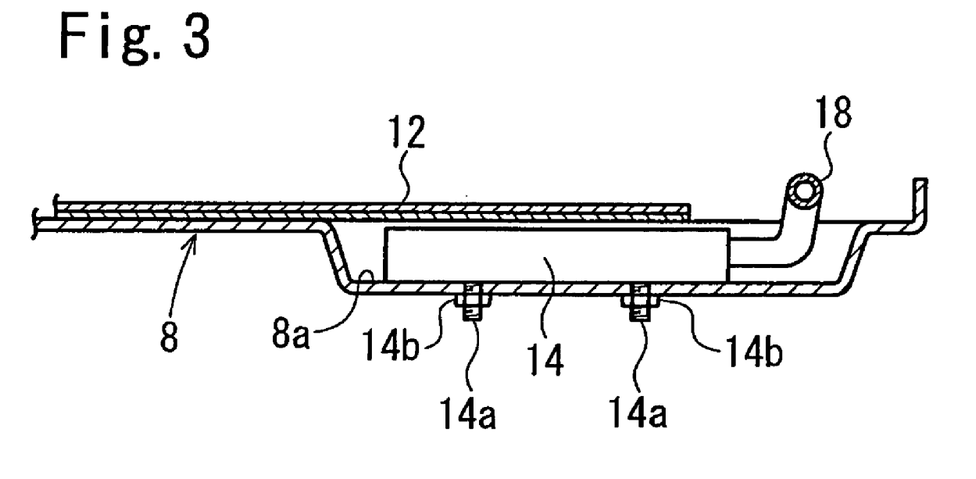
FIG. 3 is a cross-sectional view taken along a line III-III of FIG. 1.
Figure 4:
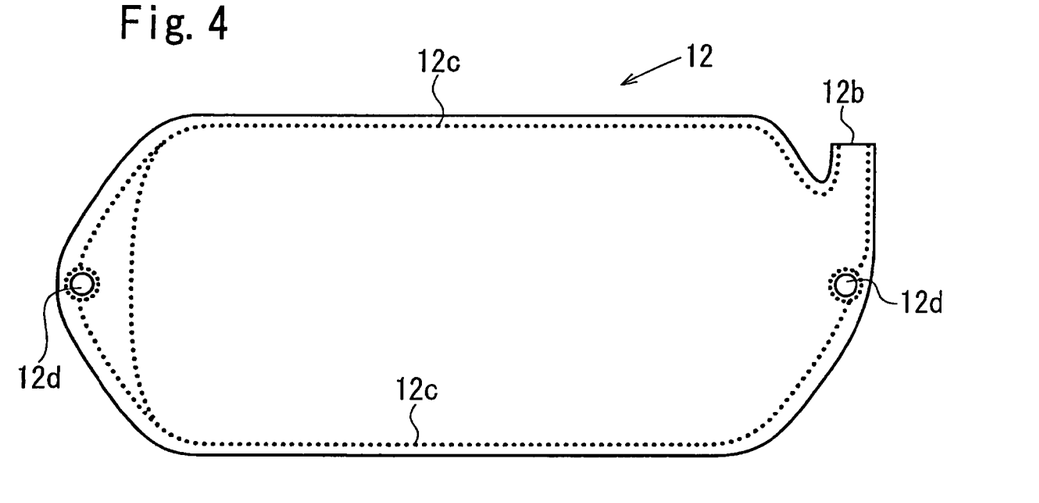
FIG. 4 is a plan view showing the bag.

FIG. 1 is a perspective view showing a seat frame provided with an occupant restraint device according to an embodiment of the present invention. FIGS. 2a, 2b, and 3 are cross-sectional views taken along a line II-II and a ling III-III of FIG. 1. FIG. 4 is a plan view showing a bag. FIG. 2a illustrates a bag in a not-inflated state, and FIG. 2b illustrates the bag in an inflated state.

A frame of a seat of an automobile includes a base frame 1, and a back frame 4 which is connected to the base frame 1 with a support shaft 2 and a reclining device (not shown) interposed therebetween so as to be rotatable with respect to the base frame 1. A headrest 6 is attached to an upper portion of the back frame 4. The base frame 1 has left and right side frames 1a and 1b. A seat pan 8 extends between front portions of the side frames 1a and 1b.

A seat cushion 9 and a seat back (not shown), which are made of urethane or the like, are provided at the base frame 1 and the back frame 4. The seat pan 8 is disposed below a front portion of the seat cushion. Reference numeral 1d in FIG. 1 denotes a spring (zigzag spring) for supporting the seat cushion.

An occupant restraint device 10 includes a bag 12 disposed above the seat pan 8 and being inflatable to push the front portion of the seat cushion from below, and a gas generator 14 for inflating the bag 12. The bag extends in a left-right direction of the seat.

As shown in FIGS. 2b and 4, the bag 12 is formed by superposing a plurality of base fabrics 12a and sewing peripheral edges of the superposed base fabrics 12a together, so as to be a bag-like form. A gas inlet 12b is provided at one end portion of the bag 12. Mounting holes 12d are provided at left and right end portions of the bag 12.

The bag 12 is placed on the seat pan 8 in a flattened state. Both end portions of the bag 12 are fixed to the seat pan 8 by way of mounting tools 16, such as bolts or rivets, through the mounting holes 12d. The base fabrics 12a each have a pair of long sides, and seams 12c extend along the long sides. The bag 12 is disposed such that the long sides of the base fabrics 12a extend in the left-right direction of the seat.

In this embodiment, a recessed portion 8a is formed at the seat pan 8, and the gas generator 14 is disposed in the recessed portion 8a. The gas generator 14 is connected to the gas inlet 12b of the bag 12 with a duct 18 interposed therebetween.

A stud bolt 14a protrudes from the gas generator 14. The stud bolt 14a protrudes to the lower side of the seat pan 8. The stud bolt 14a is fastened to the seat pan 8 with a nut 14b.

In the occupant restraint device 10 having the above-described configuration, when the front collision of the automobile is detected, the gas generator 14 blows gas, and the bag 12 is inflated upward because of the gas from the gas generator 14. Accordingly, the forward movement of the hip region of the occupant is prevented or restricted because the front portion of the seat cushion is pushed up, or because the density of the front portion of the seat cushion is increased by being pushed from below.

In this embodiment, since the bag 12 is disposed in the seat pan 8 in the flattened state without being folded, the bag 12 may be easily mounted. In addition, the frictional resistance applied from a seat cushion 9 to the bag 12 when the bag 12 is inflated is small. Therefore, without increasing the output of the gas generator, the bag may be inflated immediately.

Also, the recessed portion 8a is only required to accommodate the gas generator 14, and is not necessary to accommodate the bag 12. Thus, the depth of the recessed portion 8a may be small.

Figure 6:
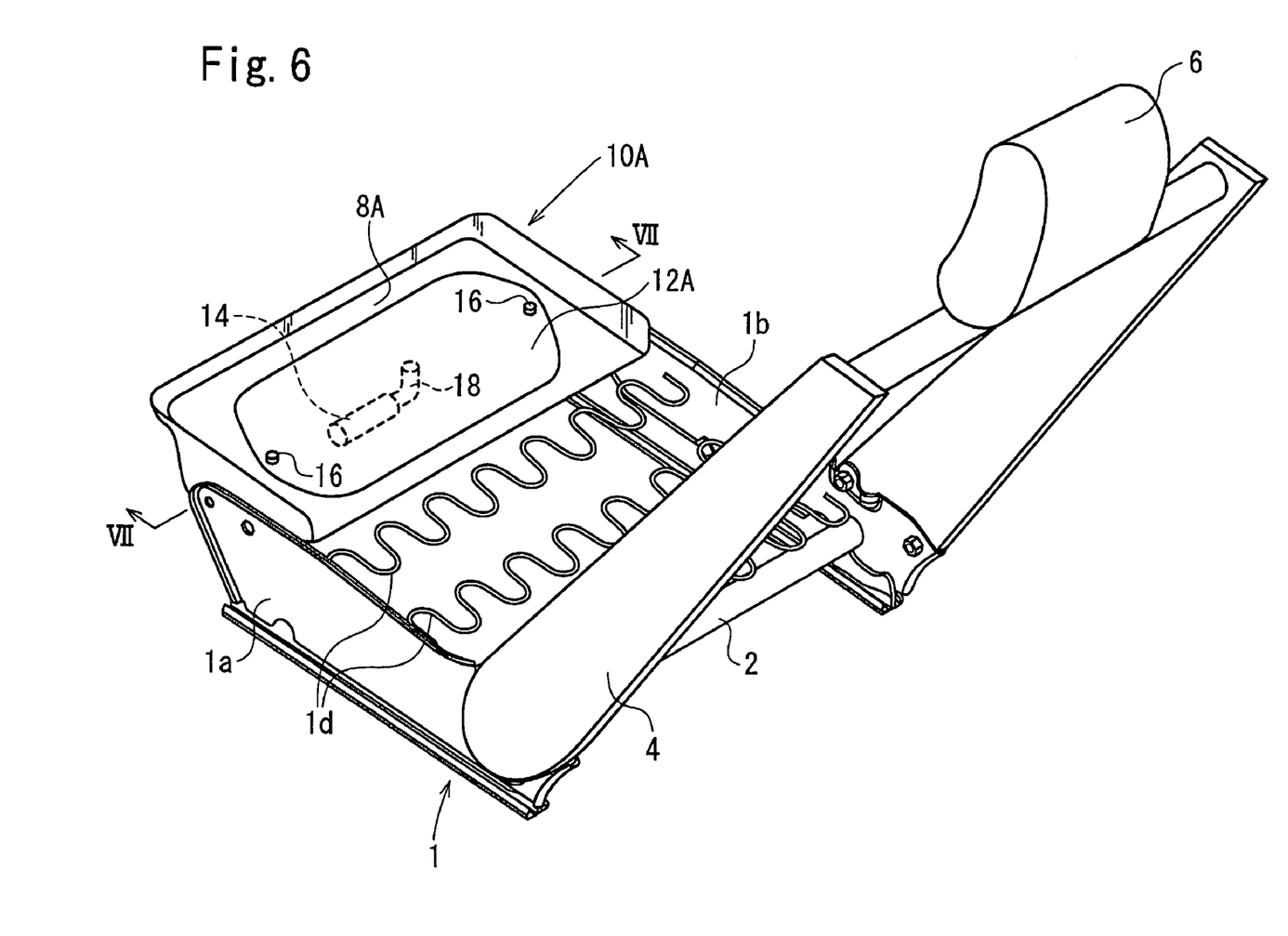
FIG. 6 is a perspective view showing an occupant restraint device according to another embodiment.
Figure 7:
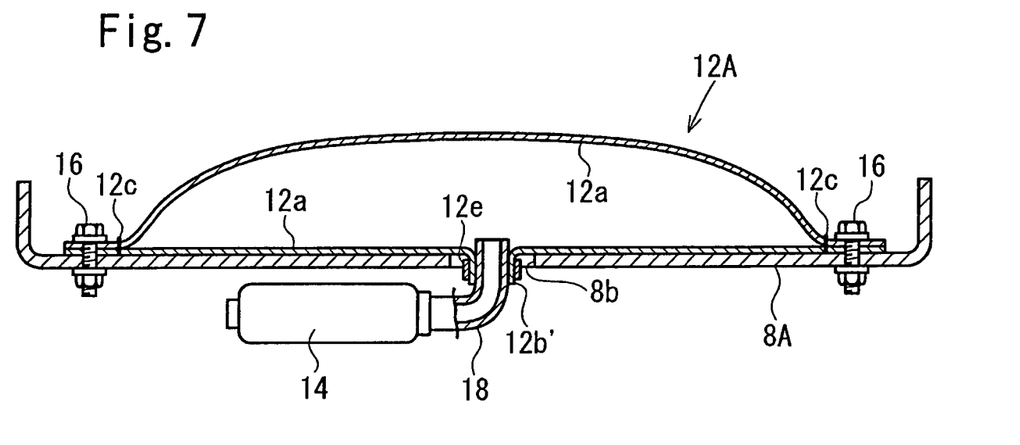
FIG. 7 is a cross-sectional view taken along a line VII-VII of FIG. 6.

FIG. 6 is a perspective view showing an occupant restraint device according to another embodiment. FIG. 7 is a cross-sectional view taken along a line VII-VII of FIG. 6. To clearly illustrate the configuration of the occupant restraint device, FIG. 7 shows a state with the bag inflated.

In such an occupant restraint device 10A of this embodiment, a bag 12A is disposed on the upper surface of a seat pan 8A in the flattened state, and left and right end portions of the bag 12A are fixed to the seat pan 8A by way of the mounting tools 16 (in this embodiment, bolts and nuts). In this embodiment, a recessed portion for mounting the gas generator is not provided at the upper surface of the seat pan 8A, and hence, the upper surface of the seat pan 8A is flat. In this embodiment, the gas generator 14 is disposed at the back side (lower side) of the seat pan 8A.

As shown in FIG. 7, in this embodiment, a gas inlet 12b' is provided at an intermediate portion in a longitudinal direction (left-right direction) of the base fabric 12a which defines the lower surface of the bag 12A. As shown in the drawing, a duct-inserting opening 8b is formed at the seat pan 8A at a position facing the gas inlet 12b'. Through the opening 8b, the gas generator 14 disposed below the seat pan 8A is connected to the gas inlet 12b' of the bag 12A disposed above the seat pan 8A with the duct 18 interposed therebetween. Also, a reference numeral 12e in FIG. 7 denotes a band that couples the duct 18 and the gas inlet 12b'.

Other configurations of the occupant restraint device 10A are the same as those of the occupant restraint device 10 shown in FIGS. 1 to 4, and like reference numerals in FIGS. 6 and 7 as those in FIGS. 1 to 4 refer like components.

In this occupant restraint device 10A, when the gas generator 14 blows the gas, the gas from the gas generator 14 is guided into the bag 12A from the lower surface of the bag 12A through the duct 18 and the gas inlet 12b', and the bag 12A is inflated upward.

In this embodiment, since the bag 12A is disposed on the seat pan 8A in the flattened state without being folded, the bag 12A may be easily mounted. In addition, the frictional resistance applied from the seat cushion (not shown in FIGS. 6 and 7) to the bag 12A when the bag 12A is inflated is small. Therefore, without increasing the output of the gas generator 14, the bag 12A may be inflated immediately.

Also, in this embodiment, since the gas generator 14 is disposed at the back side of the seat pan 8A, and thus, the gas generator 14 does not protrude upward, thereby allowing the occupant to sit on the seat cushion further comfortably.

Figure 8:
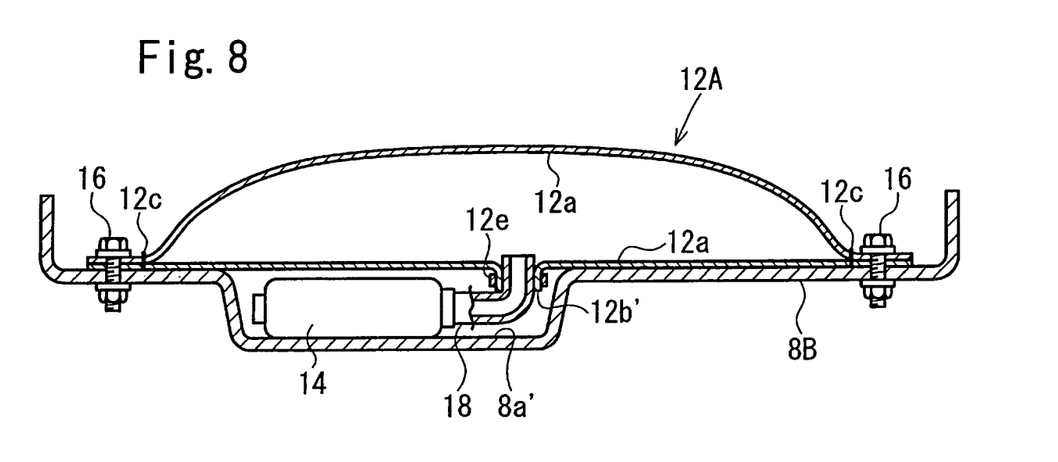
FIG. 8 is a cross-sectional view showing a part similar to that shown in FIG. 7 of an occupant restraint device according to still another embodiment.

In the case where the gas generator is disposed directly below the bag, a recessed portion may be formed at the upper surface of the seat pan similarly to the embodiment shown in FIGS. 1 to 4, and the gas generator may be disposed in the recessed portion. FIG. 8 is a cross-sectional view showing a part similar to that shown in FIG. 7 of an occupant restraint device having the above-mentioned configuration.

In a seat pan 8B of this embodiment shown in FIG. 8, a recessed portion 8a' for accommodating the gas generator 14 and the duct 18 is formed in an area corresponding to the bag 12A so as to be recessed from the upper surface of the seat pan 8B.

In this embodiment, the gas generator 14 is previously connected to the gas inlet 12b' provided at the lower surface of the bag 12A, with the duct 18 interposed therebetween. The bag 12A is placed on the seat pan 8B such that the gas generator 14 and the duct 18 are accommodated in the recessed portion 8a' and the bag 12A covers the recessed portion 8a'. Other configurations of this embodiment are similar to those in the embodiment shown in FIGS. 6 and 7.

In this embodiment, the gas generator 14 may be previously connected to the bag 12A, and these components may be unified. Accordingly, the bag 12A, the gas generator 14, and the duct 18 may be arranged merely by disposing the unified components on the seat pan 8 from above, thereby easily mounting the occupant restraint device.

In this embodiment, since the gas generator 14 and the duct 18 are accommodated in the recessed portion 8a' formed at the upper surface of the seat pan 8B, the gas generator 14 does not protrude upward, thereby allowing the occupant to sit on the seat cushion comfortably. Also in this embodiment, since the bag 12A is not accommodated in the recessed portion 8a, the depth of the recessed portion 8a' may be small.

Figure 9:
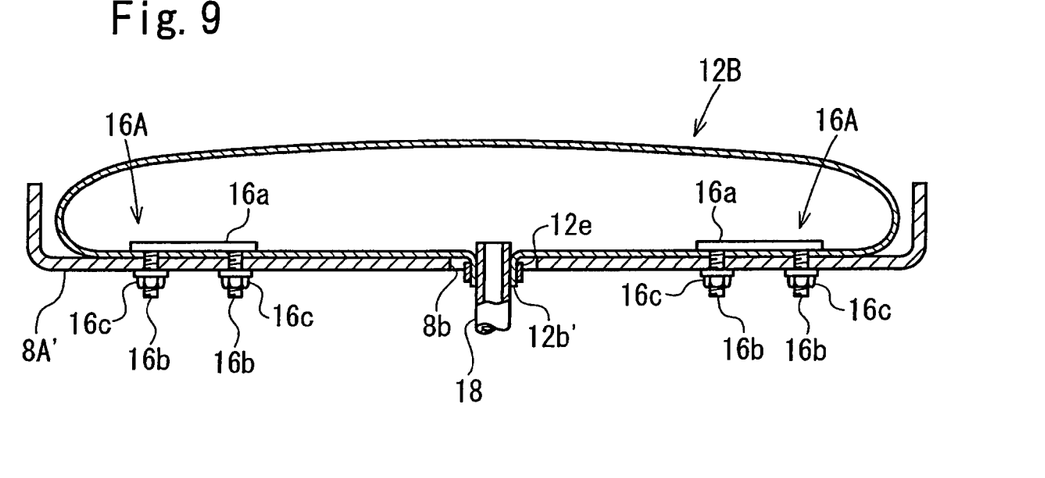
FIG. 9 is a perspective view showing a part similar to that shown in FIG. 7 of an occupant restraint device according to yet another embodiment.

While both end portions in the longitudinal direction of the bag are fixed to the seat pan by the mounting tools in the above-described embodiments, an intermediate portion in the longitudinal direction of the bag may be fixed to the seat pan. FIG. 9 is a cross-sectional view showing a part similar to that shown in FIG. 7 of an occupant restraint device having such a configuration.

In this embodiment, a bag 12B is placed on a seat pan 8A' in the flattened state, and the intermediate portion in the longitudinal direction (in the left-right direction) is fixed to the seat pan 8A' by the mounting tools 16A. Both end portions of the bag 12B do not have portions to be fixed to the seat pan, and thereby the bag 12B has an inflatable hollow chamber therein so that the thickness of the bag 12B is increased over the substantially entire length of the bag 12B from one end to the other end in the longitudinal direction. In this embodiment, two portions are fixed by the mounting tools 16A, the two portions being slightly near the one end and near the other end of the bag 12B as compared to the middle in the longitudinal direction.

The mounting tools 16A each include a pressing plate 16a for pressing the bottom surface of the bag 12B to the seat pan 8A' from the inside of the bag 12B, and a stud bolt 16b protruding downward from the lower surface of the pressing plate 16a. In this embodiment, two stud bolts 16b are provided at each of the pressing plates 16a with a gap interposed between the stud bolts 16b in the longitudinal direction of the bag 12B.

To mount the bag 12B to the seat pan 8A', the mounting tools 16A are disposed in the bag 12B, the stud bolts 16b are respectively inserted to stud-bolt-inserting holes (reference numerals thereof omitted) formed at the bottom surface of the bag 12B and the seat pan 8A', and the stud bolts 16b are fixed with nuts 16c. Accordingly, the bottom surface of the bag 12B is fixed to the seat pan 8A'.

In this embodiment, similarly to the embodiment shown in FIGS. 6 and 7, the gas inlet 12b' is provided at the lower surface of the bag 12B, and the duct-inserting opening 8b is formed at the seat pan 8A' at a position facing the gas inlet 12b'. Also, the gas generator (not shown in FIG. 9) is disposed at the back side of the seat pan 8A'. Through the opening 8b, the gas inlet 12b' is connected to the gas generator with the duct 18 interposed therebetween. However, the arrangement of the gas generator and the connection structure of the gas generator and the bag 12B are not limited thereto.

In this embodiment, since both end portions in the longitudinal direction of the bag 12B do not have a fixing portion with respect to the seat pan 8A', the bag 12B (a hollow chamber portion which is inflated to increase the thickness thereof) may extend widely from a portion near the one end to a portion near the other end of the seat pan 8A'.

Figure 10:
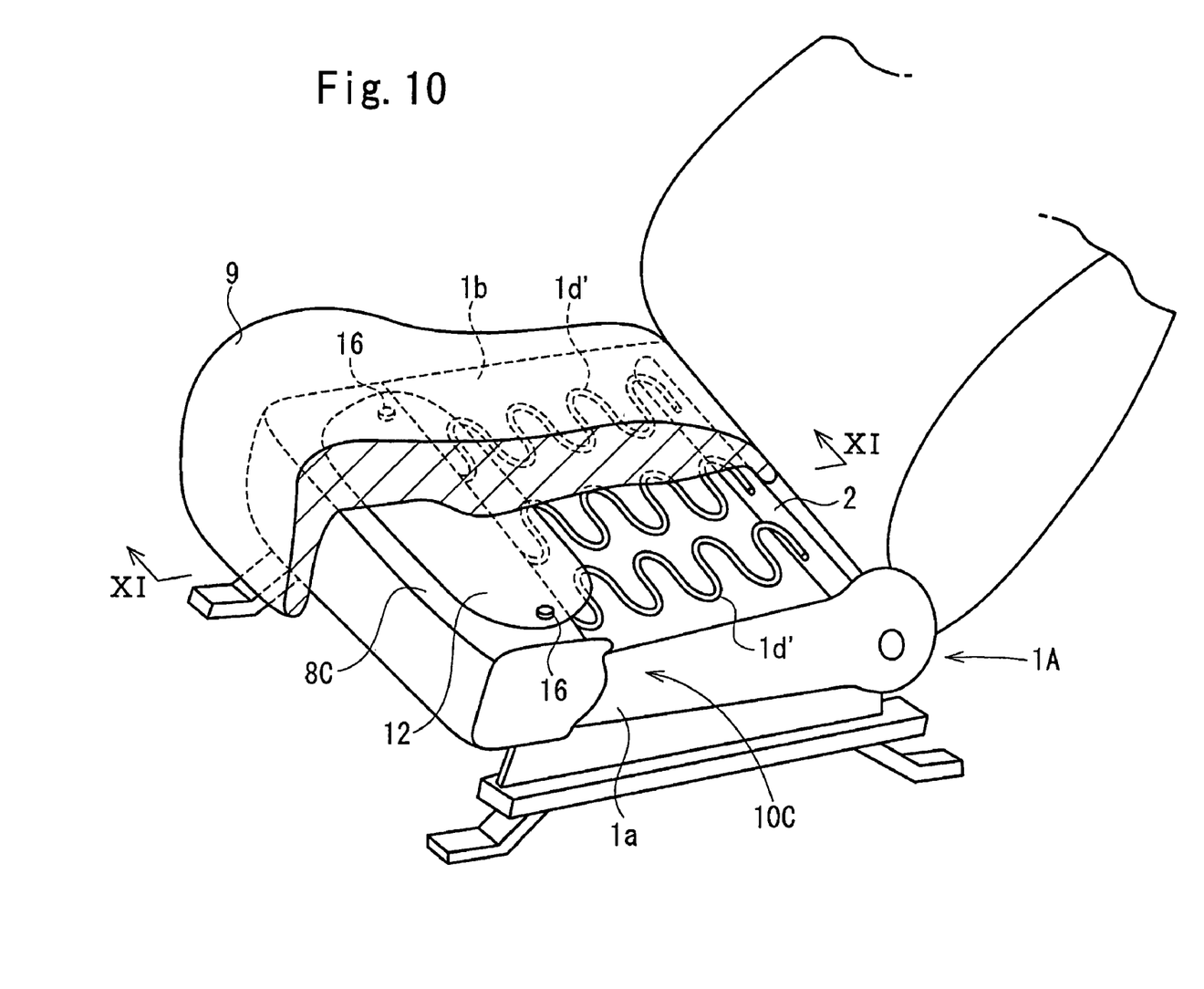
FIG. 10 is a partially sectioned perspective view showing an occupant restraint device according to yet another embodiment.
Figure 11:
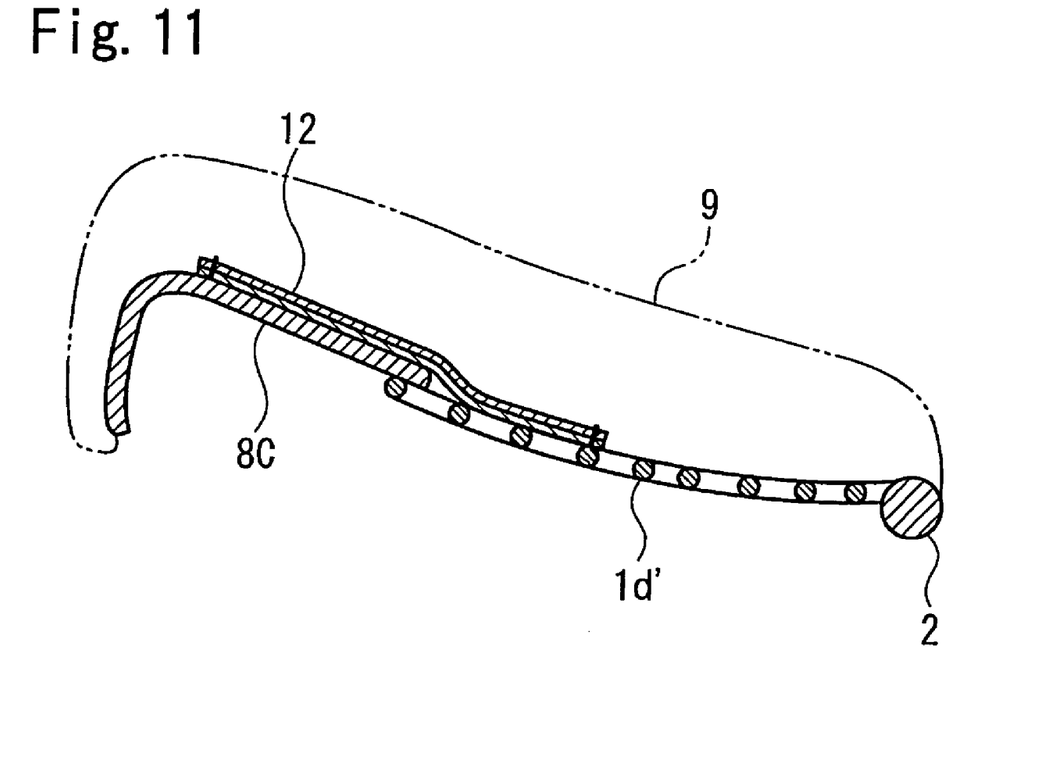
FIG. 11 is a cross-sectional view taken along a line XI-XI of FIG. 10.

In the present invention, the bag may extend to both of the seat pan and the spring in a case where the seat cushion is supported by the seat pan and the spring (zigzag spring). FIG. 10 is a partially sectioned perspective view showing an occupant restraint device having such a configuration. FIG. 11 is a cross-sectional view taken along a line XI-XI of FIG. 10. In FIG. 10, the seat cushion is illustrated such that a half defined from an intermediate portion in the left-right direction is eliminated.

In this embodiment, a base frame 1A has a length in a front-back direction of a seat pan 8C (front-back direction of the seat, the same applied hereinafter) is smaller than a length of the bag 12 in the front-back direction. Also, in this embodiment, a plurality of springs (zigzag springs) 1d' for supporting the seat cushion 9 extend between the rear end of the seat pan 8C and the support shaft 2 located at the rear end of the base frame 1A. Each spring 1d' meanders in the left-right direction and extends in the front-back direction. A front end portion of each spring 1d' is fixed to the rear end of the seat pan 8C and a rear end portion of each spring 1d' is fixed to the support shaft 2.

As shown in FIG. 11, in an occupant restraint device 10B of this embodiment, the bag 12 is disposed such that a portion extending from an intermediate portion in the front-back direction to a front edge is placed on the seat pan 8C, and a portion extending from the intermediate portion to a rear edge is placed on the springs 1d'. In the bag 12, both end portions of the portion placed on the seat pan 8C are fixed to the seat pan 8C by the mounting tools 16.

With such an arrangement, even though the length in the front-back direction of the seat pan 8C is smaller than the length in the front-back direction of the bag 12, the bag 12 may be disposed in the flattened state.

Though not shown, in this embodiment, the gas generator is disposed below the seat pan 8C, and is connected to the bag 12 through the duct. The duct may be inserted through a duct-inserting opening formed at the seat pan 8C to connect the bag 12 and the gas generator. Alternatively, the duct may pass the rear end of the seat pan 8C (pass through a space defined between the adjacent springs 1d' and 1d') to connect the bag 12 and the gas generator. The duct may pass a route other than those described above. A recessed portion may be provided at the upper surface of the seat pan 8C, and the gas generator may be disposed in the recessed portion.

Other configurations of this embodiment are similar to those in the embodiment shown in FIGS. 1 to 4.

The above-described embodiments show merely examples of the present invention, and the present invention is not limited to the above-described embodiments.

For example, the base frame of the seat is arranged such that the front end portion of the seat cushion is supported by the seat pan and the rear end portion with respect to the seat pan is supported by the springs (zigzag springs) in the above-described embodiments, the present invention may be applied to a structure in which the entire seat cushion (extending from the front end portion to the rear end portion of the seat cushion) may be supported by the seat pan similarly to the related art shown in FIG. 5.

The above-described embodiments show merely examples of the present invention, and the present invention is not limited to the above-described embodiments. It is obvious to those skilled in the art that various modifications can be made within the scope of the present invention.

The subject application is based on Japanese Patent Application (No. 2005-314860) filed on Oct. 28, 2005, the entire contents of which are incorporated herein by reference.

The invention claimed is:

1. An occupant restraint device comprising:
   a seat pan adapted to be disposed under a front part of a seat cushion;
   an inflatable bag adapted to press the seat cushion from below, at least a front portion of the bag being disposed on the seat pan; and
   a gas generator that inflates the bag in an emergency situation of a vehicle, said gas generator being arranged under the bag outside thereof, and having a duct so that the gas generator is connected to the inflatable bag through the duct;
   wherein the bag is disposed below the seat cushion with a portion of the bag to be inflated being in a flattened state substantially without being folded, and the seat pan includes a recessed portion having a size such that the gas generator and a part of the duct are disposed therein.

2. The occupant restraint device according to claim 1, wherein the entire bag is disposed on the seat pan.

3. The occupant restraint device according to claim 2, wherein the bag is formed such that base fabrics are superposed and sewn together, and the bag is disposed on the seat pan in the flattened state.

4. The occupant restraint device according to claim 2, wherein each of the base fabrics has a pair of parallel long sides, and sewing lines are provided along the long sides.

5. The occupant restraint device according to claim 1, wherein the bag extends in a left-right direction of the seat cushion.

6. The occupant restraint device according to claim 5, wherein both end portions in the left-right direction of the bag are fixed to the seat pan.

7. The occupant restraint device according to claim 1, wherein the seat pan is a plate disposed between side frames of a base frame for the seat cushion.

8. The occupant restraint device according to claim 1, wherein the recessed portion opens upwardly, and the gas generator and the part of the duct are only disposed in the recessed portion.

9. The occupant restraint device according to claim 8, wherein the bag has a gas inlet provided at a lower surface thereof and connected to the duct, and the bag completely covers the recessed portion.

* * * * *